(12) United States Patent
Pakki et al.

(10) Patent No.: US 11,756,342 B2
(45) Date of Patent: Sep. 12, 2023

(54) SYSTEM AND METHOD FOR ANALYZING VEHICLE SYSTEMS DURING VEHICLE TRAVEL

(71) Applicant: Honeywell International Inc., Morris Plains, NJ (US)

(72) Inventors: Sathish Pakki, Bangalore (IN); Thulluru Lakshmi Venkata Chandrasekhar, Bangalore (IN); Shantha Kumari, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 381 days.

(21) Appl. No.: 17/065,442

(22) Filed: Oct. 7, 2020

(65) Prior Publication Data

US 2021/0035375 A1 Feb. 4, 2021

Related U.S. Application Data

(63) Continuation of application No. 15/475,470, filed on Mar. 31, 2017, now Pat. No. 10,846,947.

(51) Int. Cl.
| | |
|---|---|
| *G07C 5/00* | (2006.01) |
| *G06Q 50/30* | (2012.01) |
| *G06Q 10/0639* | (2023.01) |
| *B60W 50/02* | (2012.01) |
| *B60W 50/14* | (2020.01) |

(Continued)

(52) U.S. Cl.
CPC ......... *G07C 5/006* (2013.01); *B60W 50/0205* (2013.01); *B60W 50/14* (2013.01); *B64D 45/00* (2013.01); *G06Q 10/0639* (2013.01); *G06Q 50/30* (2013.01); *G07C 5/0841* (2013.01); *B60W 2050/021* (2013.01); *B60W 2050/146* (2013.01); *B64D 2045/0085* (2013.01)

(58) Field of Classification Search
CPC . G07C 5/006; G07C 5/0841; B60W 50/0205; B60W 50/14; B60W 2050/021; B60W 2050/146; B64D 45/00; B64D 2045/0085; G06Q 10/0639; G06Q 50/30
See application file for complete search history.

(56) References Cited

U.S. PATENT DOCUMENTS

| | | |
|---|---|---|
| 7,809,527 B2 | 10/2010 | Bailly et al. |
| 8,754,751 B1 | 6/2014 | Picoll |
| 9,646,428 B1 | 5/2017 | Konrady et al. |

(Continued)

FOREIGN PATENT DOCUMENTS

EP 2 597 602 A1 5/2013

OTHER PUBLICATIONS

Paul M. Bursch et al., The Flight Control Maintenance Diagnostic System, pp. 1504-1509 (May 23, 1988).

*Primary Examiner* — Truc M Do
(74) *Attorney, Agent, or Firm* — Bookoff McAndrews, PLLC

(57) ABSTRACT

In one embodiment, a method is provided. The method comprises: validating data in a vehicle system database; identifying data to be collected from at least one vehicle system; validating sufficient data rights; if sufficient data rights are validated, collecting the identified data; identifying at least one analysis to be performed; performing the at least one analysis on the collected data; identifying at least one analysis report to be generated; and generating the at least one analysis report.

20 Claims, 5 Drawing Sheets

(51) Int. Cl.
 *B64D 45/00* (2006.01)
 *G07C 5/08* (2006.01)

(56) References Cited

U.S. PATENT DOCUMENTS

| | | |
|---|---|---|
| 2001/0018628 A1 | 8/2001 | Jenkins et al. |
| 2002/0143421 A1 | 10/2002 | Wetzer |
| 2002/0143443 A1 | 10/2002 | Betters et al. |
| 2004/0254698 A1 | 12/2004 | Hubbard et al. |
| 2008/0281658 A1 | 11/2008 | Siessman |
| 2009/0326991 A1 | 12/2009 | Wei et al. |
| 2010/0083056 A1 | 4/2010 | Spier et al. |
| 2016/0042325 A1 | 2/2016 | Avery et al. |
| 2016/0119151 A1 | 4/2016 | Park et al. |
| 2016/0335816 A1* | 11/2016 | Thoppae ............... G07C 5/0841 |
| 2017/0134382 A1* | 5/2017 | Darnell ................. H04W 4/029 |

\* cited by examiner

SYSTEM AND METHOD FOR ANALYZING VEHICLE SYSTEMS DURING VEHICLE TRAVEL

CROSS-REFERENCE TO RELATED APPLICATION(S)

This patent application is a continuation U.S. patent application Ser. No. 15/475,470, filed Mar. 31, 2017, which is herein incorporated by reference in its entirety.

BACKGROUND

Modern aircraft include many systems that perform, e.g., a variety of communications, monitoring and control functions on the aircraft. It is desirable to analyze the performance of such aircraft systems to analyze their performance and to predict their failures. Typically, data from such systems is downloaded from the aircraft when it is on the ground, and then transferred to a computer system for analysis. A specific system on a single aircraft, or an aggregate of the same specific system on many aircraft, can be analyzed to ascertain, and sometimes improve, system performance, trends, and to predict failures.

This analysis takes place after the aircraft has landed. It does not permit monitoring and analyzing the performance of such systems during aircraft flight. Further, it does not permit identification or prediction of failures during flight. As a result, systems may degrade or fail during flight without an aircraft crew's knowledge. This can result in danger to the aircraft, and its crew, passengers and cargo. Accordingly, there is a need for to identify and/or predict system failures during flight.

SUMMARY

In one embodiment, a method is provided. The method comprises: validating data in a vehicle system database; identifying data to be collected from at least one vehicle system; validating sufficient data rights; if sufficient data rights are validated, collecting the identified data; identifying at least one analysis to be performed; performing the at least one analysis on the collected data; identifying at least one analysis report to be generated; and generating the at least one analysis report.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Furthermore, there is no intention to be bound by any expressed or implied theory presented in the preceding background and summary, or the following detailed description.

For pedagogical purposes, a vehicle may be described hereinafter as an aircraft. However, it is understood that the teachings herein are applicable to other types of vehicles including without limitation space craft, ships, automobiles, buses, trains, and any other vehicle. Thus, a pilot of an aircraft is more generically referred to as an operator of a vehicle 101. An airline is more generically referred to as an owner of a vehicle.

Figure 1A:
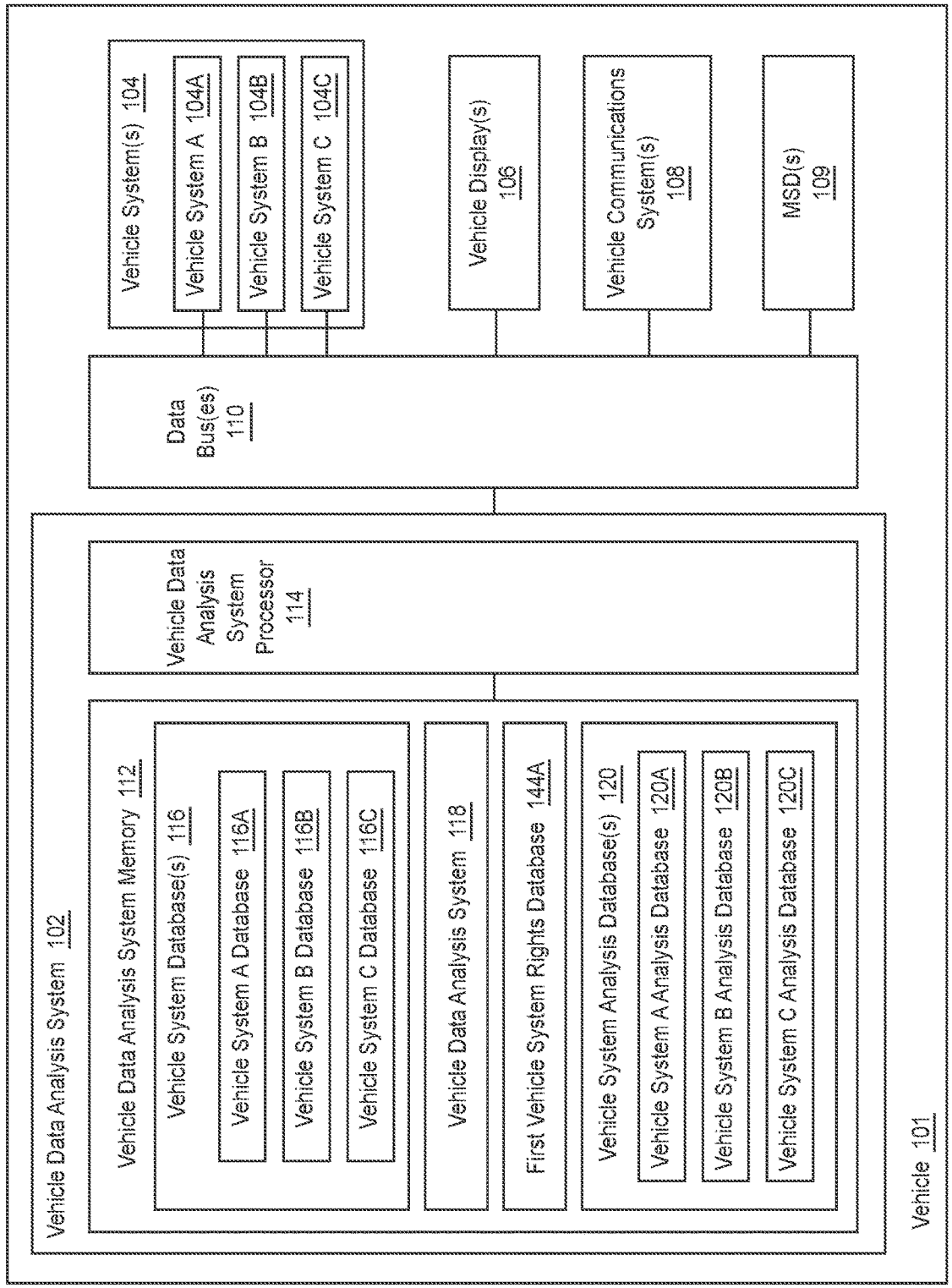
FIG. 1A illustrates one embodiment of a vehicle including a vehicle data analysis system which analyzes, during vehicle travel, data from at least one vehicle system.

FIG. 1A illustrates one embodiment of a vehicle 101 including a vehicle data analysis system 102 which analyzes data, during vehicle travel, from at least one vehicle system 104. In one embodiment, the vehicle data analysis system 102 dynamically analyzes data from one or more vehicle systems and dynamically generates a report that can be used to improve system, e.g. hardware and/or software, performance and/or dynamically provides corrective action to the operator, e.g. pilot, of the vehicle 101. In another embodiment, the analysis of one or more vehicle systems can be used to ascertain if there is transient abnormal behavior of, repeatable abnormal behavior of, a trend in the behavior of, or a potential enhancement that needs to be made to the one or more vehicle systems, e.g. to the hardware and/or software of the one or more vehicle systems. In a further embodiment, the vehicle data analysis system 102 assists in identifying non-reproducible issues, e.g. in hardware and/or software, by dynamically monitoring them. In yet another embodiment, the vehicle data analysis system 102 provides historical trend analysis of one or more vehicle systems for a specific vehicle or for more than one vehicle; such analysis can be used to find patterns in vehicle system performance that can be used to improve such performance.

In one embodiment, the vehicle data analysis system 102 is, or is part of, a central maintenance unit, a central maintenance computer, a communications management unit, a communications management computer, a flight management unit, and/or a flight management computer. In another embodiment, the vehicle data analysis system 102 is a standalone system. The data analysis is performed and reported as specified in at least one vehicle system database 116, as will be subsequently be described in further detail. The databases as described herein may be databases in the conventional sense, or any other means of storing data in memory such as for example data files.

The at least one vehicle system 104 may include one or more vehicle systems that are vehicle sensors, one or more vehicle communications systems, one or more vehicle control systems, and/or one or more vehicle mechanical systems. In one embodiment, a vehicle system is a line replaceable unit (LRU). In another embodiment, each vehicle system may include hardware and/or software. Examples of vehicle sensors include pitot tubes, angle of attack vanes, and weather radar. Examples of vehicle communications systems include HF, VHF, satellite, cellular network, Wi-Fi, Wi-Max, and AeroMACs voice and/or data communications systems. Examples of vehicle control systems include an autopilot, a flight management system, a communications management system, and a central maintenance unit. Examples of one or more vehicle mechanical systems include engines, an environmental control system, and landing gear.

In one embodiment, the vehicle 101 includes the vehicle data analysis system 102, at least one vehicle system 104, at least one vehicle display 106, at least one vehicle communications system 108, and at least one mass storage device (MSD(s)) 109. In another embodiment, the at least one vehicle system 104 includes two or more vehicle systems, e.g. vehicle system A 104A, vehicle system B 104B, and vehicle system C 104C. In a further embodiment, the vehicle data analysis system 102, the at least one vehicle system 104, the at least one vehicle display 106, the at least one vehicle communications system 108, and/or the at least one mass storage device 109 are coupled to one another, e.g. by at least one vehicle data bus (Data Bus(es) 110. The at least one vehicle data bus 110 conveys data between components coupled by the at least one vehicle data bus 110. In yet another embodiment, each of the at least vehicle bus 110 can be wired or wireless.

The at least one vehicle data bus 110 routes data between vehicle data analysis system 102, the at least one vehicle system 104, the at least one vehicle displays 106, the at least one vehicle communications system 108, and/or the at least one mass storage device 109. In one embodiment, the at least one vehicle data bus 110 includes one or more of an Aeronautical Radio Inc. (ARINC) 429 data bus, avionic full-duplex switched Ethernet (AFDX) data network, and/or a controller area network (CAN) bus. In another embodiment, data from a vehicle system may be automatically delivered to the at least one vehicle data bus 110, e.g. by a vehicle system. In a further embodiment, the vehicle data analysis system 102 may have to request, and then receive, data from a corresponding vehicle system, e.g. over the at least one data bus 110, such data.

In one embodiment, the at least one vehicle display 106 includes at least one multi-function display. In another embodiment, the at least one vehicle display 106 includes at least one touchscreen display.

In one embodiment, the at least one vehicle communications system 108 includes one or more of an HF, VHF, satellite, cellular network, WiFi, WiMax, AeroMACs, and/or any other type of communications system. In another embodiment, each communications system includes a transceiver and corresponding antenna.

In one embodiment, the at least one mass storage device 109 comprises one or more hard drives, optical disc drives, and/or solid state drives. In another embodiment, some or all of the data, e.g. the reports and/or the analysis from one or more vehicle system analysis databases are archived for period(s) of time which may vary by data depending upon the database to which the data corresponds. In a further embodiment, the at least one mass storage device 109 includes at least one of a datalink recorder or flight data recorder.

In one embodiment, the vehicle data analysis system 102 comprises a vehicle data analysis system memory 112 coupled to a vehicle data analysis system processor 114. In another embodiment, the vehicle data analysis system 102 may be implemented, in whole or in part, with a state machine or a field programmable gate array. In a further embodiment, the vehicle data analysis system memory 112 may be comprised of one or more memory sub-systems, e.g. read only memory, random access memory, a solid state drive, a removable flash or thumb drive, a hard drive, and/or a handheld device. In yet another embodiment, one or more memory elements may be located off board the vehicle, e.g. in a cloud storage system, the ground data center 103, operations center 107, or other terrestrial or non-terrestrial location(s). Items, such as databases, stored in the vehicle data analysis system memory 112 may be stored in one or more of such memory sub-systems. In yet another embodiment, the systems and the databases stored in the vehicle data analysis system memory 112 are executed and/or processed by the vehicle data analysis system processor 114.

In one embodiment, the vehicle data analysis system memory 112 includes at least one vehicle system database 116. In another embodiment, there is a unique vehicle system database for each vehicle system. For example, as illustrated in FIG. 1A, the at least one vehicle system database 116 includes vehicle system A database 116A, vehicle system B database 116B, and vehicle system C database 116C. Vehicle system A database 116A, vehicle system B database 116B, and vehicle system C database 116C correspond respectively to vehicle system A 104A, vehicle system B 104B, and vehicle system C 104C. In a further embodiment, there is a unique vehicle system database for more than one vehicle system.

In one embodiment, the vehicle management memory 112 includes a first vehicle system rights database 144A. In another embodiment, the first vehicle system rights database 144A includes information, e.g. specified by the manufacture of each vehicle system, that sets forth the rights of third parties (i.e. not the vehicle system manufacturer) in each type of data generated by the corresponding vehicle system. For example, the first vehicle system rights database 144A specifies which third parties (e.g. vehicle system manufacturers and/or owners, or other parties (such as analysis services businesses and/or governmental entities) performing analysis and/or review of data from such systems) can access and utilize specific types of data for specific vehicle systems.

The rights granted to third parties may vary depending upon each third party. In one embodiment, different third parties may have different rights for the same type of data; the first vehicle system rights database 144A specifies such rights on a party by party basis. In another embodiment, the first vehicle system rights database 144A specifies how long a third party's rights last, e.g. the expiration date of such rights. In a further embodiment, the vehicle data analysis system 102 verifies with the first vehicle system rights database 144A that a vehicle system database has rights in specific data generated from a vehicle system before providing such data to the vehicle data analysis system 102 to perform the analysis prescribed by the vehicle system database. In yet another embodiment, the first vehicle system rights database 144A is created by the manufacturer of the vehicle or the system used to create the vehicle system database, e.g. a vehicle system database editing system.

In one embodiment, the vehicle data analysis system memory 112 includes a vehicle data analysis system 118. The vehicle data analysis system 118 has numerous functions. In one embodiment, the vehicle data analysis system 118 verifies that the vehicle data analysis system 102 has rights to obtain and use data from a specific vehicle system. In another embodiment, the vehicle data analysis system 118 initiates the collection of data from the specific vehicle system. In a further embodiment, the vehicle data analysis system 118 compresses, i.e. the data storage size of, the data collected from the specific vehicle system. In yet another embodiment, the vehicle data analysis system 118 analyzes the data collected from the specific vehicle system. In yet a further embodiment, the vehicle data analysis system 118 generates a report of the analysis of the data collected from the specific vehicle system.

In one embodiment, the vehicle data analysis system 118 stores, in at least one vehicle system analysis database 120, the data analysis and/or the report of the data analysis. In another embodiment, the vehicle system analysis database 120 is dynamic, e.g. can change over time. In a further embodiment, there is a unique vehicle system analysis database for each vehicle system. In yet another embodiment, each vehicle system analysis database is created upon operation of the vehicle data analysis system 102.

For example, as illustrated in FIG. 1A, the at least one vehicle system analysis database 120 includes vehicle system A analysis database 120A, vehicle system B analysis database 120B, and vehicle system C analysis database 120C. Vehicle system A analysis database 120A, vehicle system B analysis database 120B, and vehicle system C analysis database 120C correspond respectively to vehicle system A 104A, vehicle system B 104B, and vehicle system C 104C. In one embodiment, there is a unique vehicle system analysis database for more than one vehicle system. In another embodiment, the at least one vehicle management system database 116 and the at least one vehicle system analysis database 120 may be incorporated into a single database.

In one embodiment, the vehicle data analysis system 118 directs the transmission of the analysis report(s), e.g. stored in the at least one vehicle system analysis database 120, to the at least one vehicle display 106 so that the analysis can be viewed in the vehicle 101, e.g. by the operator of the vehicle 101. In another embodiment, the vehicle data analysis system 118 directs the transmission the analysis report(s) to the at least one vehicle communications system 108, e.g. to be sent to a remote location.

Figure 1B:
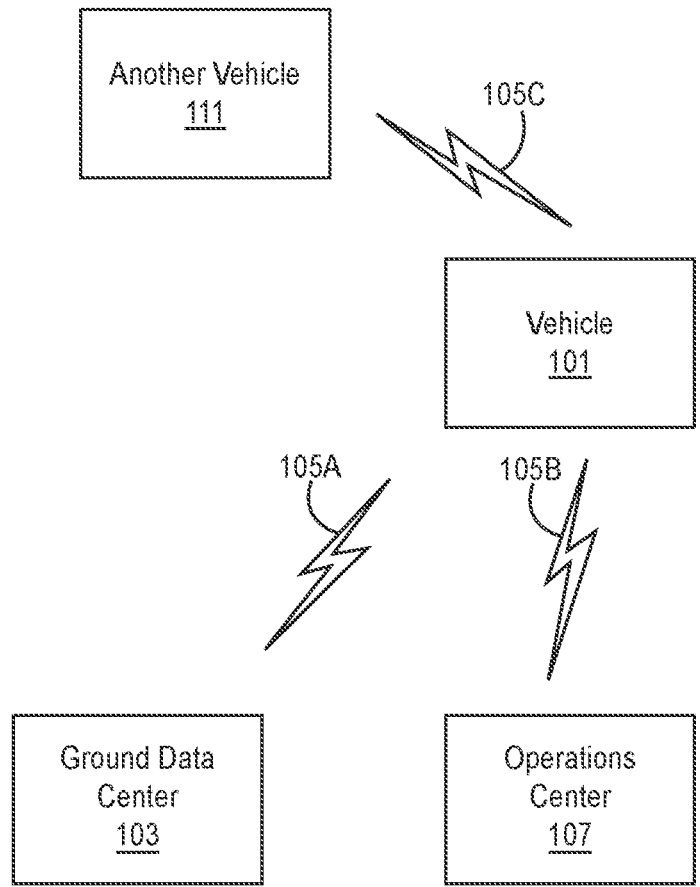
FIG. 1B illustrates one embodiment of the vehicle coupled by a first communications link, a second communications link, and/or a third communications link respectively to a ground data center, an operations center, and/or another vehicle.

FIG. 1B illustrates one embodiment of the vehicle 101 coupled by a first communications link 105A, a second communications link 105B, and/or a third communications link 105C respectively to a ground data center 103, an operations center 107, and/or another vehicle 111. In one embodiment, the vehicle 101 may be coupled to just one of such centers or vehicle. In another embodiment, the ground data center 103 is a cloud computing system. In a further embodiment, the operations center 107 is a vehicle operations center such as an airline operations center, or is a vehicle traffic control center such as an air traffic control center. The ground data center 103 and/or the operations center 107 can also include facilities of manufacturers of one or more of the at least one vehicle system 104, or third parties, such as governmental entities, who evaluate the performance of such of at least one vehicle system 104.

In one embodiment, each of the first communications link 105A, the second communications link 105B, and third communications link 105C include one or more of an HF, VHF, satellite, cellular network, WiFi, WiMax, AeroMACs, and/or any other type of communications link. In another embodiment, the at least one vehicle communications system 108 transmits the report to the ground data center 103 and/or the operations center 107 over the corresponding communications link(s). In a further embodiment, the vehicle 101 may be coupled by another communication link to another vehicle or ground location.

Figure 1C:
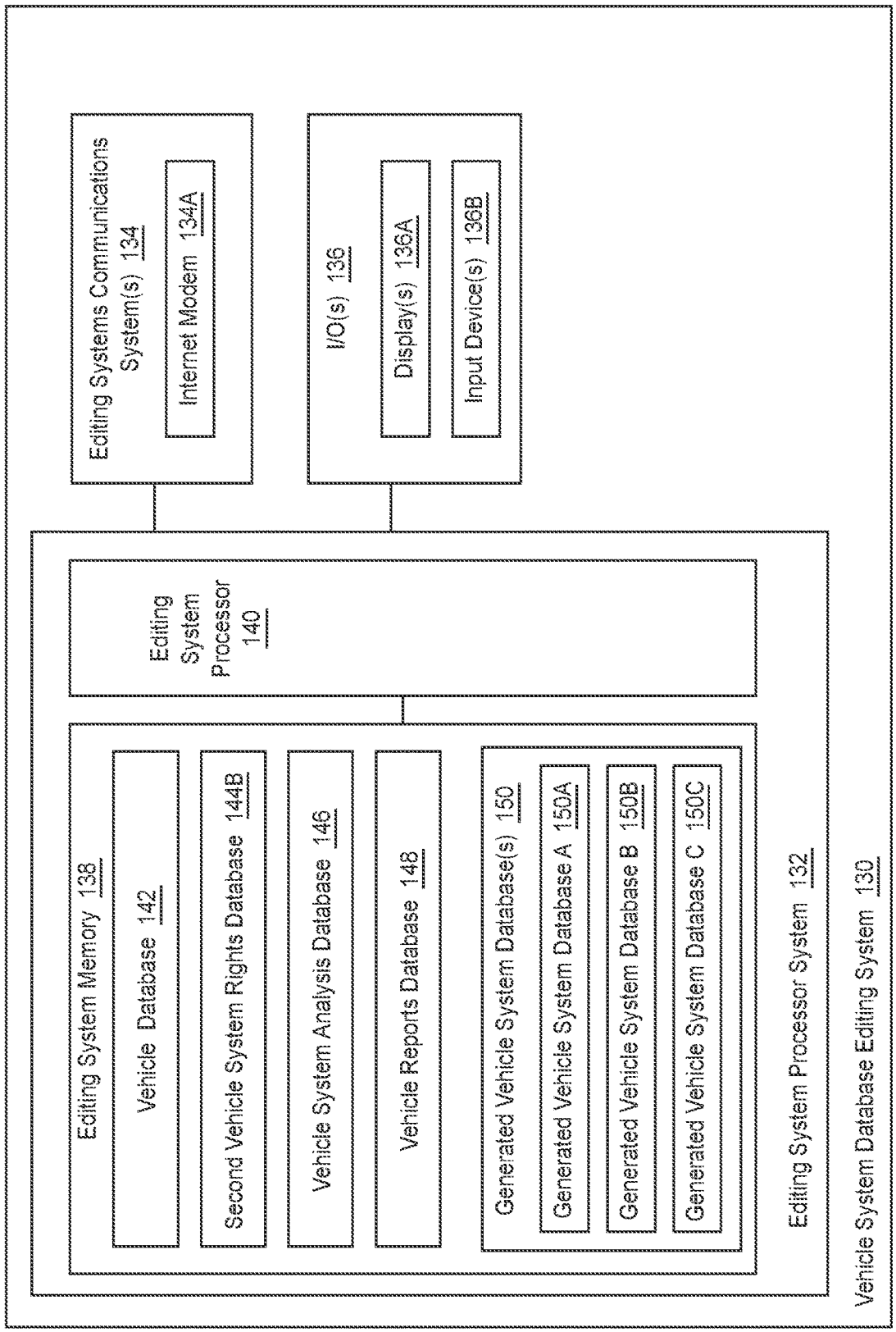
FIG. 1C illustrates one embodiment of a vehicle system database editing system.

FIG. 1C illustrates an embodiment of a vehicle system database editing system 130. The vehicle system database editing system 130 creates the vehicle system database(s) 116 to be used in the vehicle data analysis system 102. In another embodiment, the manufacturer or owner of the vehicle, or the manufacturer of one or more vehicle subsystems or a sub-system comprising one or more vehicle subsystems, use the vehicle system database editing system 130 to create a vehicle system database. In a further embodiment, the vehicle system database editing system 130 can be utilized terrestrially or airborne. In yet another embodiment, the vehicle system database editing system 130 can be utilized by different types of users including governmental entities, vehicle manufacturers and owners, and vehicle component manufacturers and owners.

In the embodiment illustrated in FIG. 1C, the vehicle system database editing system 130 includes an editing system processor system 132 including an editing system memory 138 and an editing system processor 140. Alternatively, the vehicle system database editing system 130 can be implemented in part or altogether with a state machine or a field programmable gate array.

In one embodiment, the editing system memory 138 comprises a vehicle database 142, a second vehicle system rights database 144B, a vehicle system analysis database 146, a vehicle reports database 148, and at least one generated vehicle system database 150. In another embodiment, some or all of these databases can be combined into one or more databases. In a further embodiment, the at least one generated vehicle system database 150 may be create only after the editing system memory 138 is used.

In one embodiment, the vehicle database 142 includes information about the vehicle systems in one or more types of vehicles 101, e.g. owned by one or more owners of vehicles 101. In another embodiment, the data includes information about vehicle systems, the types of data generated, e.g. automatically or upon request, by the vehicle systems, and/or the acceptable ranges for each type of data. In a further embodiment, the data may be provided directly from vehicle system(s) or from a storage device such as the mass storage device 109. Such information may include, for example, turbine rotation rate or air speed, vehicle system or cabin temperature, and fault indicators about the one or more vehicle systems.

In one embodiment, the second vehicle system rights database 144B includes information, e.g. specified by the manufacture of each vehicle system, that sets forth the rights of third parties (i.e. not the vehicle system manufacturer) in each type of data generated by the corresponding vehicle system. For example, the second vehicle system rights database 144B specifies which third parties can access and utilize specific types of data for specific vehicle systems. In another embodiment, different third parties may have different rights for the same type of data. In a further embodiment, the first vehicle system rights database 144A specifies how long a third party's rights last, e.g. the expiration date of such rights. In yet another embodiment, the second vehicle system rights database 144B includes decryption key for each vehicle system which identifies the parties having rights to the data and the scope of their rights (including a time period or expiration date for such rights). In yet a further embodiment, if generated vehicle system database has been granted rights, the second vehicle system rights database 144B transfers a decryption key to the generated vehicle system database, to be stored in the database, to permit the generated vehicle system database to access and/or decrypt data provided by the corresponding vehicle system.

In one embodiment, if the vehicle system database editing system 130 seeks data from a vehicle system for which rights have not been granted, the vehicle system database editing system 130 will alert the person or system trying to create the corresponding generated vehicle system database and/or prevent creation of such database. In another embodiment, upon receiving such an alert, the person or system can request from the owner or manufacturer of the vehicle system rights. In a further embodiment, such a request can be sent by the vehicle system database editing system 130 through an at least one editing system communications system 134. The vehicle system owner or manufacturer can authorize rights to the requester, e.g. for a finite period. As a result, the vehicle system database editing system 130 updates its second vehicle system rights database 144B, and, e.g., transfers a decryption key as specified above.

In one embodiment, the vehicle system analysis database 146 includes different types of analysis. The analysis techniques may include regression techniques, e.g. simple or multiple linear regression, or multivariate linear, or curve fitting. In one embodiment, the vehicle reports database 148 includes one or more different, e.g. tabular or graphical, report formats. For example, a graphical chart can illustrate fuel consumption versus altitude, or can illustrate VHF data radio ground station signal strength versus location. Further, a graphical chart or table can compare data during current travel versus past travel of the same or even different vehicles.

In one embodiment, the at least one generated vehicle system database 150 includes one or more generated vehicle system databases that can be down loaded to be transferred to the at least one vehicle system database 116 in a vehicle data analysis system 102. Thus, a generated vehicle system database is intended to be used as, and become, a vehicle system database in the vehicle data analysis system 102.

In one embodiment, the vehicle system database editing system 130 includes the at least one editing system communications system 134, e.g. including an Internet modem 134A. In another embodiment, the vehicle database editing system 130 is located in a cloud based server system, and is remotely accessed, e.g. through the Internet modem 134A, by users seeking to create and download vehicle system databases. In a further embodiment, the vehicle database editing system 130 is located in a computer proximate to the user, e.g. a personal computer, work station or server. In such an embodiment, at least one input/output interface (I/O(s)) 136 are coupled the editing system processor system 140. In yet another embodiment, the I/O(s) 136 includes at least one display 136A, e.g. a touch screen, and at least one input device 136B, e.g. a cursor control device and/or a keyboard.

In one embodiment, a vehicle system database is created by the manufacturer of the corresponding vehicle system. Alternatively, a third party creates the database to the extent the third party has rights to access the data generated by the corresponding vehicle system(s). When creating the database, the following are specified:

(a) data to be collected and analyzed;
(b) analysis technique;
(c) format(s) of report disclosing analysis;
(d) report delivery location(s); and
(e) action(s).

In one embodiment, items (a) through (c) are mandatory, and items (d) and (e) are optional. The specific data to be collected and analyzed is a set or sub-set of data generated by one or more vehicle systems. The data may include performance data (e.g. turbine rotation rate, geographical location, air speed, and/or fuel remaining), environmental data (e.g. temperature, pressure, air density, and/or wind vector velocity), and the reliability (e.g. communications system signal strength and/or fault indicator(s)) of or about the one or more vehicle systems. In another embodiment, data may be collected from software using debug tracing.

The analysis techniques may include regression techniques, e.g. simple or multiple linear regression, or multivariate linear, or curve fitting. For example, when the selected analysis technique, e.g. defined in a vehicle system database, is linear regression of the collected data over time, e.g. from a vehicle sensor, the vehicle system database can seek to determine whether a slope determined by the linear regression has exceeded a threshold or window and/or whether a standard deviation of the collected data is increasing over time. The format(s) of the report disclosing the analysis can be in tabular data format and/or in graphical format. The report delivery location can be a vehicle display and/or a remote location such as a ground data center and/or an operations center. Finally, the vehicle system database may include one or more actions that are undertaken in the event of certain analysis results, e.g. exceed a threshold or detecting a fault, and can include alerting the operators of the vehicle 101 through the at least one displays 106, uploading a new vehicle system database to replace the current vehicle system database which generated the action, or communicating an alert to the remote location. Also, in such event, the vehicle system database may request that a replacement database be uploaded to the vehicle 101 while it is travelling to permit further analysis of the results, e.g. the fault, as the vehicle 101 continues in its travel. Also, the one or more actions may include corrective actions, e.g. a list of instructions such as a work around, that can be taken by the crew of the vehicle 101 that are provided to the at least one displays 106. In another embodiment, the list of instructions may be provided until a fault is corrected in the corresponding vehicle system(s), e.g. by replacing firmware or software. Further, the one or more actions may include selection and use of one vehicle component over another, e.g. one sensor in lieu of another sensor. For example, the vehicle data analysis system 102 may recommend or select the use of a first VHF data radio over a second VHF data radio, or reset the second VHF data radio, because it has detected that the operational performance, e.g. receiver sensitivity or transmitter power, is superior in the first compared to the second.

Figure 2:
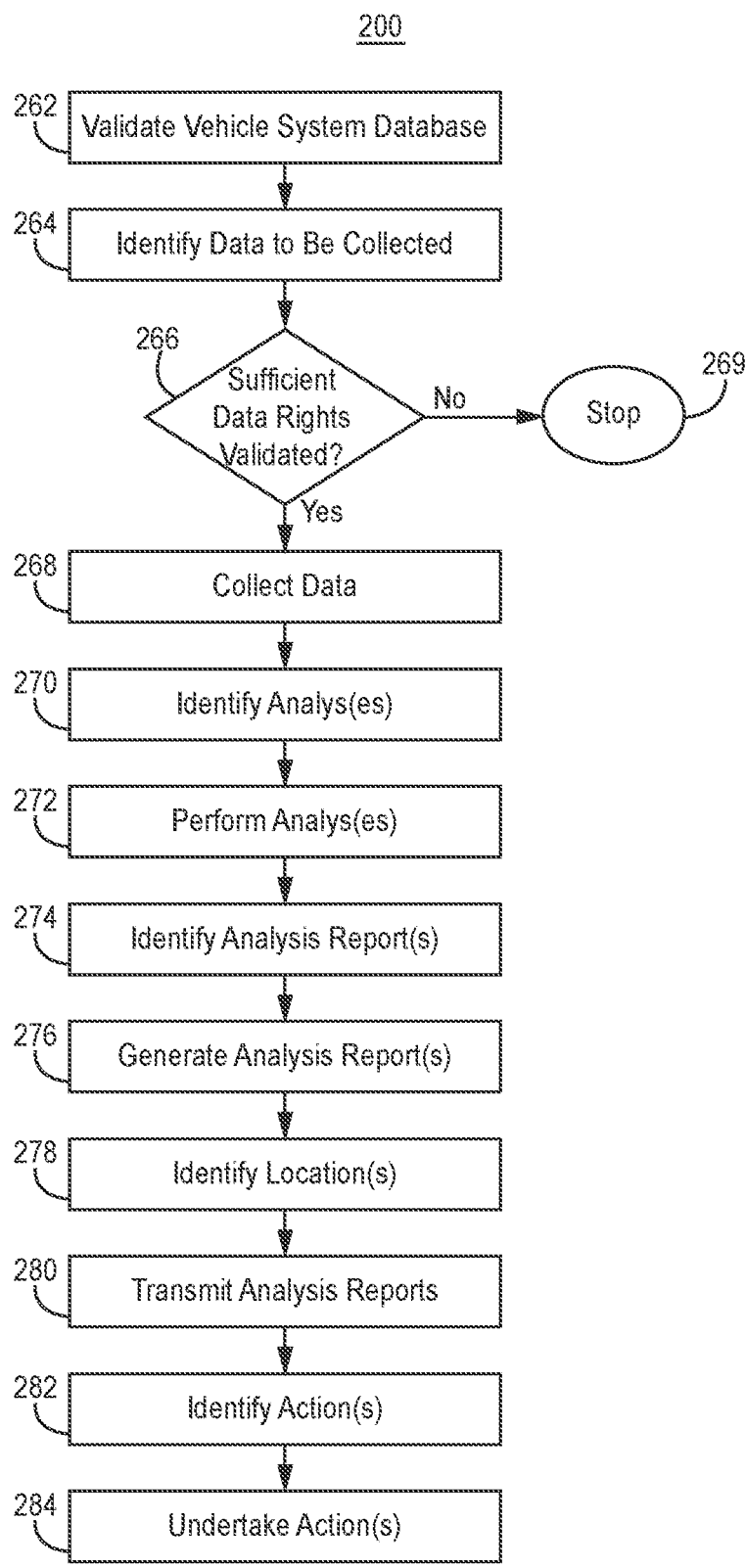
FIG. 2 illustrates one embodiment of a method for analyzing vehicle systems during vehicle travel.

FIG. 2 illustrates one embodiment of a method 200 for analyzing a vehicle system during vehicle travel. To the extent that the embodiment of method 200 shown in FIG. 2 is described herein as being implemented in the systems shown in FIGS. 1A-B, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 262, validate the data in a vehicle system database corresponding to at least one vehicle system whose data is to be analyzed. In one embodiment, such validation ensures that that type of data and the analysis type are appropriate for the corresponding vehicle system. For example, ensure that the data being measured by a vehicle system that is a pitot tube is speed rather than, e.g. altitude. In another example, validation includes verifying that the version of software operating in a vehicle system is compatible, e.g. with the vehicle system database for the corresponding vehicle system, to ensure that the vehicle system is configured to provide the data required for analysis.

In block 264, identify, e.g. from the corresponding vehicle system database, the data to be collected from the at least one vehicle system. In block 266, validate that the vehicle data analysis system 102 has sufficient rights to access data from the at least one vehicle system, and to use the data. In other words, validate sufficient data rights. In one embodiment, not all manufacturers of vehicle systems are willing to allow all data generated by the system to be used by a third party, e.g. such as those described above. In another embodiment, the corresponding vehicle system database identifies which data may be accessed and used by specified parties. In another embodiment, the vehicle data analysis system 102 confirms with the first vehicle rights database 144A that such vehicle system database is authorized to access and use such data. In a further embodiment, data generated by each vehicle system is encrypted. If the vehicle system database has a valid decryption key, e.g. which has not expired, the vehicle data analysis system 102 can decrypt, and thus access and use such data. In yet another embodiment, the vehicle data analysis system 118 performs the decryption.

In block 269, if the vehicle system database is not authorized to access and use some or all of the data, the process is stopped; else proceed to block 268. In one embodiment, send a communication to an owner or author of the vehicle system database that the database was not authorized to access and use certain data, and/or that the process was halted.

In block 268, collect data from the at least one vehicle system. In one embodiment, collect data that is automatically generated by, or generated in response to a request to, e.g. a vehicle system. In another embodiment, store the collected data, e.g. in the vehicle data analysis system memory 112. In another embodiment, compress the collected data prior and store the compressed collected data. In block 270, identify, e.g. from the corresponding vehicle system database, at least one analysis to be performed on the collected data.

In block 272, perform the identified at least one analysis, and, e.g. store in a corresponding vehicle system analysis database. In one embodiment, the at least one analysis determines whether there are errors or bugs in the at least one vehicle system such as transient abnormal behavior, repeatable abnormal behavior, a trend in the behavior. In another embodiment, the at least one analysis determines whether a potential enhancement needs to be made to the one or more vehicle systems.

In one embodiment, the analysis is a linear regression of the collected data over time, and a determination of whether the slope determined by the linear regression has exceeded a threshold and/or whether the standard deviation of the measurements is increasing over time; this is further illustrated above. In another embodiment, decompress the collected data, if it has been compressed, prior to performing the analysis.

In block 274, identify the at least one analysis report to be generated, e.g. from the corresponding vehicle system database. In block 276, generate at least one analysis report, e.g. using data specified in the corresponding vehicle system database.

In one embodiment, in block 278, identify at least one location to transmit the at least one report. In another embodiment, in block 280, transmit the analysis the at least one analysis report, e.g. to the specified location(s). In a further embodiment, transmit the analysis report to at least one vehicle display 106 in the vehicle 101. In yet another embodiment, transmit the analysis report to a ground data center 103 and/or an operations center 107. In a further embodiment, the analysis report is transmitted to a third party as described above.

In one embodiment, in block 282, identify at least one action to be undertaken, e.g. based upon the at least one report, and possibly other data, as described herein. In another embodiment, in block 284, undertake the at least one action.

Figure 3:
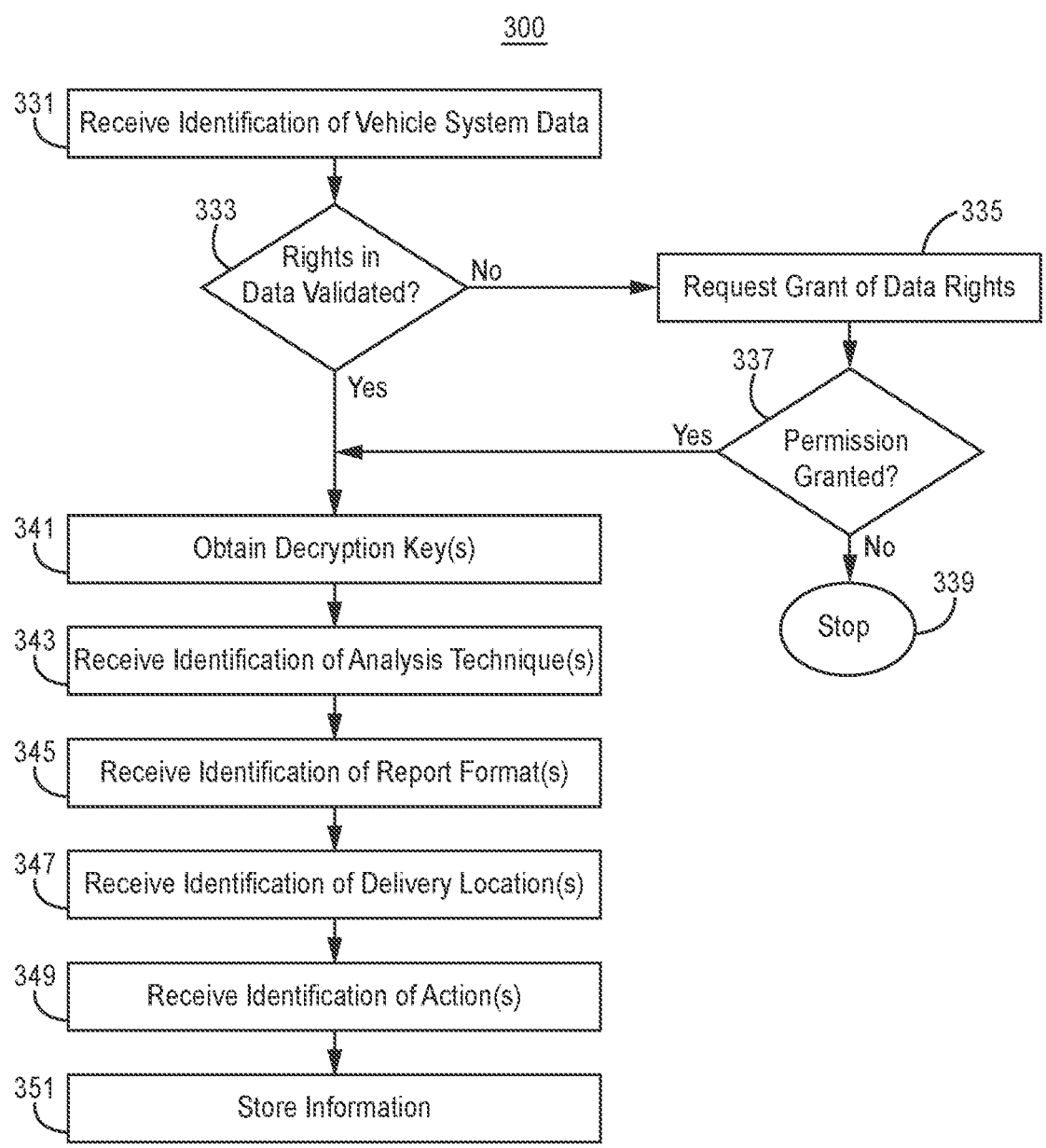
FIG. 3 illustrates one embodiment of a method 300 generating a vehicle system database.

FIG. 3 illustrates one embodiment of a method 300 generating a vehicle system database. To the extent that the embodiment of method 300 shown in FIG. 3 is described herein as being implemented in the systems shown in FIG. 1C, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 331, receive identification of vehicle system data to be used, e.g. analyzed. In one embodiment, identify the at least one vehicle system generating such data. For example, information may be specified by a user of a vehicle system database editing system 130 such as a person or computer.

In block 333, validate, e.g. using the second vehicle system rights database 144B, whether the entity generating the vehicle system database is authorized to access and use such data. In one embodiment, the entity may be identified with a login and password used to access, e.g. the vehicle system database editing system 130. In another embodiment, the entity may be identified by a token which the entity uses to access, e.g. the vehicle system database editing system 130.

If rights are validated, proceed in one embodiment to block 341, or in another embodiment to block 343. If rights are not validated, e.g. the entity does not have rights in data from at least one vehicle system, then in another embodiment, in block 335, request grant of data rights from, e.g. the owner(s) and/or manufacturer(s) of the at least one vehicle system to grant rights to the entity. In block 337, determine if the data rights, or permission, were granted. If permission is not granted, in block 339 stop the vehicle system database generation process; in a further embodiment, notify the entity, seeking to generate the vehicle system database, that the process has been halted. If permission is granted, then proceed, in one embodiment to block 341, or in another embodiment to block 343

In one embodiment, in block 341, obtain, e.g. from the second vehicle rights database 144B, at least one decryption key corresponding to the data of the at least one data system to permit decryption of such data. In another embodiment, such the at least one decryption key includes a time limit after which the at least one decryption key no longer functions, and the corresponding data can no longer be decrypted.

In one embodiment, in block 343, receive identification of at least one analysis technique to be performed on the data. In block 345, receive identification of at least one report format specifying the format analysis results.

In one embodiment, in block 347, receive identification of at least one location to deliver the at least one report, i.e. the analysis result. In another embodiment, in block 349, receive identification of any actions to be taken and any other corresponding data, e.g. threshold(s), based upon the analysis results. In block 351, store information, e.g. in a generated vehicle system database, comprising the identified data, and identity of the corresponding at least one vehicle system, the identified at least one analysis technique, and the at least one report format. In another embodiment, also store at least one encryption key corresponding to data, the at least one locations, and the at least one action.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a vehicle data analysis system, comprising: a vehicle data analysis system processor; a vehicle data analysis system memory coupled to the vehicle data analysis system processor; wherein the vehicle data analysis system memory comprises: a vehicle data analysis system; at least one vehicle system database; and a vehicle system rights database; wherein the vehicle data analysis system is configured, as specified in the at least one vehicle system database, to analyze data from at least one vehicle system and generate at least one report; and wherein each of the at least one vehicle system database specifies at least one vehicle system, data from each of the at least one vehicle system to be analyzed by the vehicle data analysis system, at least one type of analysis to be performed on such data, and at least one report format.

Example 2 includes the vehicle data analysis system of Example 1, wherein the at least one vehicle system analysis database is configured to store at least one of the analyzed data and the at least one report.

Example 3 includes the vehicle data analysis system of any of Examples 1-2, wherein each of the at least one vehicle system database further specifies the destination of transmission of at least one of the at least one report.

Example 4 includes the vehicle data analysis system of any of Examples 1-3, wherein each of the at least one vehicle system database further specifies at least one action.

Example 5 includes the vehicle data analysis system of any of Examples 1-4, further comprising at least one vehicle system analysis database.

Example 6 includes a vehicle, comprising: a vehicle data analysis system, comprising: a vehicle data analysis system processor; a vehicle data analysis system memory coupled to the vehicle data analysis system processor; wherein the vehicle data analysis system memory comprises: a vehicle data analysis system; at least one vehicle system database; and a vehicle system rights database; wherein the vehicle data analysis system is configured, as specified in the at least one vehicle system database, to analyze data from at least one vehicle system and generate at least one report; and wherein each of the at least one vehicle system database specifies at least one vehicle system, data from each of the at least one vehicle system to be analyzed by the vehicle data analysis system, at least one type of analysis to be performed on such data, and at least one report format; at least one vehicle data bus coupled to the vehicle data analysis system; at least one vehicle system coupled to the at least one vehicle data bus; and at least one of at least one vehicle display and at least one vehicle communications system, coupled to the vehicle data bus.

Example 7 includes the vehicle of Example 6, further comprising at least one mass storage device coupled to the vehicle data bus.

Example 8 includes the vehicle of any of Examples 6-7, wherein the at least one vehicle system analysis database is configured to store at least one of the analyzed data and the at least one report.

Example 9 includes the vehicle data analysis system of any of Examples 6-8, wherein each of the at least one vehicle system database further specifies the destination of transmission of at least one of the at least one report.

Example 10 includes the vehicle data analysis system of any of Examples 6-9, wherein each of the at least one vehicle system database further specifies at least one action.

Example 11 includes the vehicle data analysis system of any of Examples 6-10, further comprising at least one vehicle system analysis database.

Example 12 includes a vehicle system database editing system, comprising: an editing system processor system; wherein the editing system processor system comprises: an editing system processor; an editing system memory coupled to the editing system processor; and wherein the editing system memory comprises: a vehicle database; a vehicle systems analysis database; and a vehicle reports database.

Example 13 includes the vehicle system database editing system of Example 12, wherein the editing system memory further comprises at least one of: a vehicle system rights database, and at least one generated vehicle system database.

Example 14 includes the vehicle system database editing system of any of Examples 12-13, further comprising at least one of: at least one editing system communications system coupled to the editing system processor system, and at least one input/output interface coupled to the editing system processor system.

Example 15 includes a method, comprising: validating data in a vehicle system database; identifying data to be collected from at least one vehicle system; validating sufficient data rights; if sufficient data rights are validated, collecting the identified data; identifying at least one analysis to be performed; performing the at least one analysis on the collected data; identifying at least one analysis report to be generated; and generating the at least one analysis report.

Example 16 includes the method of Example 15, further comprising: identifying at least one location to transmit the at least one analysis report; and transmitting the at least one analysis report to the at least one location.

Example 17 includes the method of any of Examples 15-16, further comprising:
identifying at least one action to undertake as a result of the at least one analysis report; and undertaking the at least one action.

Example 18 includes a method, comprising: receiving identification of data and at least one corresponding vehicle system that generates the data; receiving identification of at least one analysis technique with which to analyze the data; receiving identification of at least one report format to use to generate a report of the analyzed data; and storing the identification of data, the at least one corresponding vehicle system, the at least one analysis technique, and the at least one report format.

Example 19 includes the method of Example 18, further comprising: receiving identification of at least one report delivery location; receiving identification of at least one action; and storing the identification of the at least one report delivery location and the at least one action.

Example 20 includes the method of any of Examples 18-19, further comprising: validating data rights in the data; and if data rights are not validated, then requesting granting of the data rights.

What is claimed is:

1. A vehicle data analysis system, the system comprising:
   a database onboard a vehicle, the database storing:
      a decryption key for at least one vehicle system; and
      data access rights stored separately from the decryption key, the data access rights created by a manufacturer of the vehicle system, the data access rights specifying permissions for accessing data relating to the at least one vehicle system; and
   at least one processor configured to:
      receive a request for the data relating to the at least one vehicle system;
      determine whether the data access rights authorize access to the data relating to the at least one vehicle system; and
      in accordance with a determination that the data access rights authorize access to the data relating to the at least one vehicle system, transferring the decryption key, the decryption key enabling decryption of the data relating to the at least one vehicle system.

2. The system of claim 1, wherein the database is a first database, wherein the system includes a second database, and wherein the decryption key is transferred from the first database to the second database.

3. The system of claim 2, wherein the second database specifies which data is to be requested from the first database.

4. The system of claim 3, wherein the second database further specifies a format of a report to be generated using the data relating to the at least one vehicle system, and wherein the at least one processor is further configured to:
   generate the report having the format specified in the second database; and
   output the report.

5. The system of claim 4, wherein the second database specifies a destination for the report, and wherein the at least one processor is further configured to transmit the report to the destination.

6. The system of claim 3, wherein the at least one vehicle system is a first vehicle system, wherein the decryption key is a first decryption key, and wherein the data access rights are first data access rights, wherein the system further comprises:
   a third database onboard a vehicle, the third database storing:
      a second decryption key for a second vehicle system; and
      separate from the second decryption key, second data access rights created by a manufacturer of the second vehicle system, the second data access rights specifying permissions for accessing data relating to the second vehicle system, and wherein the at least one processor is further configured to:
   receive a request for the data relating to the second vehicle system;
   determine whether the second data access rights authorize access to the data relating to the second vehicle system; and
   in accordance with a determination that the second data access rights do not authorize access to the data relating to the second vehicle system, perform at least one of generating an alert or preventing access to the data relating to the second vehicle system.

7. The system of claim 1, wherein the data access rights specify different permission for different parties.

8. The system of claim 1, wherein the permissions for accessing data relating to the at least one vehicle system include a permission that has an expiration time.

9. A computer-implemented method for analysis of vehicle data, the method comprising:
   receiving a request for data relating to at least one vehicle system;
   determining whether data access rights authorize access to the data relating to the at least one vehicle system, wherein the data access rights are stored on a database onboard a vehicle having the vehicle system, and wherein the data access rights are created by a manufacturer of the vehicle system; and
   in accordance with a determination that the data access rights authorize access to the data relating to the at least one vehicle system, transferring a decryption key from the database, thereby enabling decryption of the data relating to the at least one vehicle system.

10. The method of claim 9, wherein the database is a first database, and wherein the decryption key is transferred to a second database.

11. The method of claim 10, wherein the second database specifies which data is to be requested from the first database.

12. The method of claim 11, the method further comprising:
   generating a report having a format specified in the second database; and
   outputting the report.

13. The method of claim 12, the method further comprising:
   transmitting the report to a destination specified by the second database.

14. The method of claim 11, wherein the request is a first request, wherein the at least one vehicle system is a first vehicle system, wherein the decryption key is a first decryption key, and wherein the data access rights are first data access rights, wherein the method further comprises:
   receiving a second request for data relating a second vehicle system;
   determining whether second data access rights authorize access to the data relating to the second vehicle system, wherein the second data access rights are stored on a third database onboard the vehicle having the second vehicle system, and wherein the second data access rights are created by a manufacturer of the second vehicle system; and
   in accordance with a determination that the second data access rights authorize access to the data relating to the second vehicle system, transferring a decryption key from the third database to the first database in order to allow decryption of the data relating to the second vehicle system.

15. The method of claim 9, wherein the data access rights specify different permissions for different parties.

16. The method of claim 15, wherein the data access rights specify permissions for accessing data relating to the at least one vehicle system, and wherein the permissions for accessing data relating to the at least one vehicle system include a permission that has an expiration time.

17. A non-transitory computer-readable medium storing instructions that, when executed by a processor, cause the processor to perform a method for analysis of vehicle data, the method comprising:

receiving a request for data relating to at least one vehicle system;

determining whether data access rights authorize access to the data relating to the at least one vehicle system, wherein the data access rights are stored on a database onboard a vehicle having the vehicle system, and wherein the data access rights are created by a manufacturer of the vehicle system; and in accordance with a determination that the data access rights authorize access to the data relating to the at least one vehicle system, transferring a decryption key from the database, thereby enabling decryption of the data relating to the at least one vehicle system.

18. The non-transitory computer-readable medium of claim 17, wherein the database is a first database, and wherein the decryption key is transferred to a second database.

19. The non-transitory computer-readable medium of claim 18, wherein the second database specifies which data is to be requested from the first database.

20. The non-transitory computer-readable medium of claim 19, wherein the request is a first request, wherein the at least one vehicle system is a first vehicle system, wherein the decryption key is a first decryption key, and wherein the data access rights are first data access rights, wherein the method further comprises:

receiving a second request for data relating a second vehicle system;

determining whether second data access rights authorize access to the data relating to the second vehicle system, wherein the second data access rights are stored on a third database onboard the vehicle having the second vehicle system, and wherein the second data access rights are created by a manufacturer of the second vehicle system; and in accordance with a determination that the second data access rights authorize access to the data relating to the second vehicle system, transferring a decryption key from the third database to the first database in order to allow decryption of the data relating to the second vehicle system.

* * * * *